No. 753,204. PATENTED FEB. 23, 1904.
M. NIRDLINGER.
METHOD OF MANUFACTURING CUSHION TIRES.
APPLICATION FILED JAN. 22, 1900.
NO MODEL.
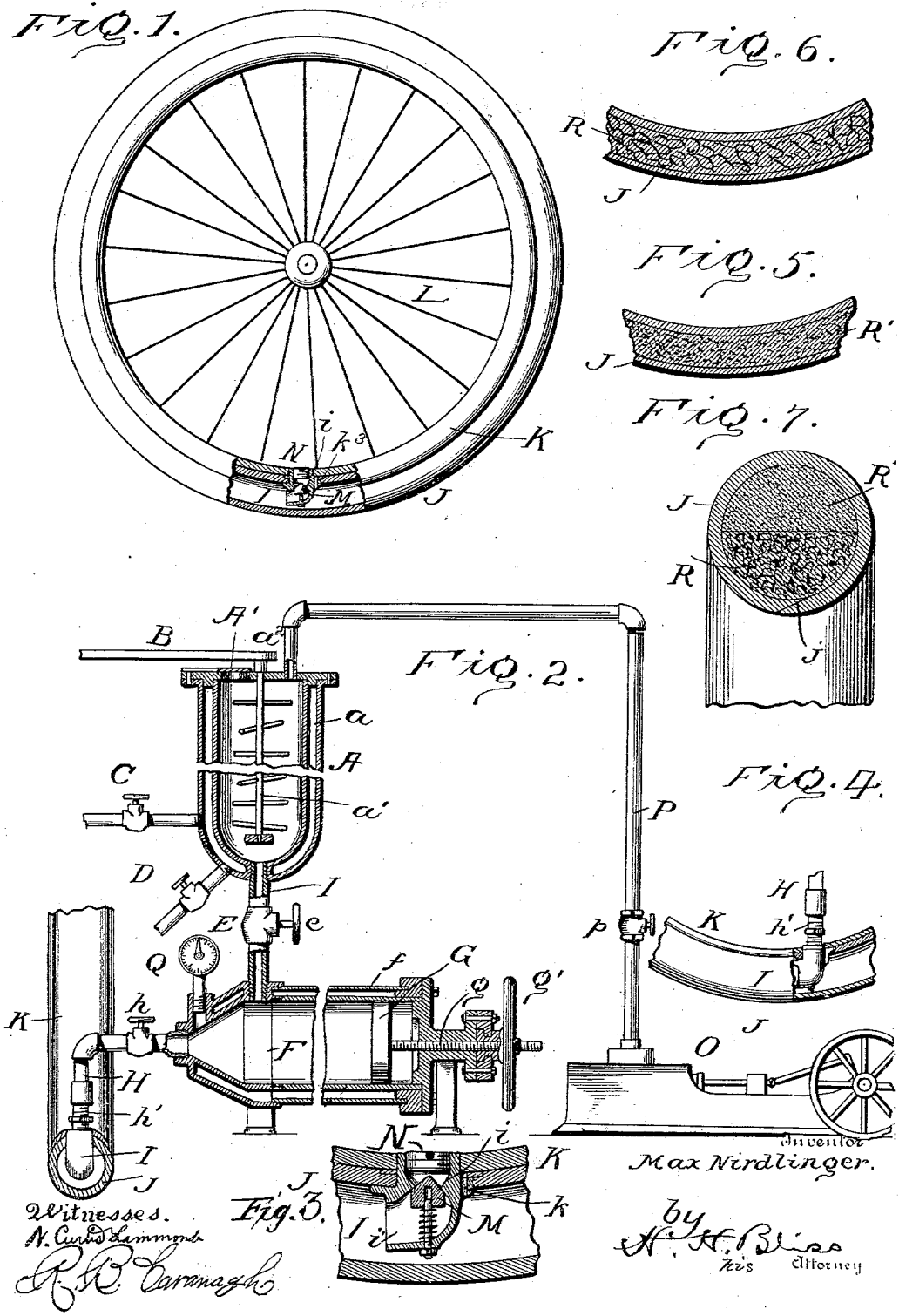

No. 753,204.

Patented February 23, 1904.

UNITED STATES PATENT OFFICE.

MAX NIRDLINGER, OF PHILADELPHIA, PENNSYLVANIA.

METHOD OF MANUFACTURING CUSHION-TIRES.

SPECIFICATION forming part of Letters Patent No. 753,204, dated February 23, 1904.

Application filed January 22, 1900. Serial No. 2,358. (No model.)

*To all whom it may concern:*

Be it known that I, MAX NIRDLINGER, a citizen of the United States, residing at Philadelphia, in the county of Philadelphia and State of Pennsylvania, have invented certain new and useful Improvements in Methods of Manufacturing Cushion-Tires, of which the following is a specification, reference being had therein to the accompanying drawings.

This invention relates to an improved method for constructing vehicle-tires.

Figure 1 is a side view of a tire adapted to be made or finished by following my improved process, the wheel being also shown in face view. Fig. 2 is a view, partly in elevation and partly in section and more or less conventional, of an apparatus for supplying the filling material for the tire and for applying pressure thereto. Fig. 3 is a section, on a larger scale, of the filling-tube and retaining device applied to the tire. Fig. 4 is a view showing the manner of connecting the filling-tube to the charging apparatus. Figs. 5, 6, and 7 are sections of tires, showing modified forms of filler applied in accordance with my invention.

Heretofore cushion-tires for vehicles which have been proposed as substitutes for pneumatic tires have belonged to one or the other of two or three classes. In those of one class use has been made of metal in one form or another combined with the tire-tube in such way as to give a resilient support for the wheel. In another class of devices the tubes have been supplied with fillers formed of elastic, rubber-like, or similar bodies. It is to devices of the latter sort that the present invention pertains. In all cases heretofore with which I am acquainted the filler has been made by molding an elongated rubber-like body external to the tire-tube and introducing it thereinto after such forming. With tires of this sort no success whatever has been attained, because of the fact that it was impossible to obtain and maintain the necessary tautness or distention of the external tube and because of the constant slipping and movement of the tube and filler one as to the other. I have overcome the difficulties incident to tires of this class by providing a filler which is of such nature that after the tire is finished the external tube is held sufficiently distended or taut and the filler is intimately connected with and bound to the external tube, so that movements or motions of one as to the other are impossible.

My process can be carried out by any of several mechanisms. I have herein shown one which I have found adapted to this purpose.

A indicates a mixing-tank, surrounded by a steam-jacket $a$ and having a filling door or aperture at A'. It has an agitating or mixing shaft $a'$, provided with stirring-blades, which is rotated by a pulley $a^2$ and a belt B. Steam of the desired temperature is introduced at C and the water or steam withdrawn at D.

F indicates a charging vessel communicating with the mixing-tank A through the duct E, the latter being opened and closed by the valve $e$.

As described in my other application for improved filling material and tire, I employ an elastic resilient rubber-like filling mass composed of suitable ingredients, such as glue, petrea, syrup, pine-tar, and a sponging composition, such as lime, saleratus, and vinegar. These or their equivalents or substitutes are placed in the vessel A, where they are properly heated and sufficiently commingled, and they are thereafter conducted to the vessel F, and by the latter the combination can be introduced into the tire. This charging vessel is also steam-jacketed, as shown at $f$, and is provided with a piston or plunger, which can be operated in any suitable way—as, for instance, by a screw rod $g$ and a hand-nut $g'$. The vessel F delivers to a tube or duct H under the control of a valve $h$, the duct H being adapted to be detachably connected to the filling-tube I. The latter is preferably permanently connected with the rubber tube J of the tire or with the felly K of the wheel L, or, as shown, connected with both—that is to say, having a shank part $i$, which engages with the felly K and also passes through the tube J. Preferably the tube I is turned laterally, as shown at $i'$ at Fig. 3, so that the filling material can be turned in the direction of the curve of the tire. At $k$ there is a vent for the air from the chamber in the tube J, and of such vents there may be as many as are found necessary.

The filling-tube I is shown as having a check-valve M, which may be of any suitable sort and which in some cases may be dispensed with.

The duct H, connected with the charging vessel F, has an adjustable coupling piece or thimble $h'$ connected with it by a thread and adapted to be connected by another thread with the filling-tube I.

N is a closing piece or cap for the outer end of the filling-tube I. When it is desired to insert filling material into the tube, this cap N is withdrawn and the threaded thimble $h'$ is inserted, as shown in Figs. 2 and 4. After the material has been introduced the part $h'$ is again withdrawn and the cap N replaced.

At O there is a conventional illustration of an air-compressor, which, so far as details of practical construction are concerned, may be of any preferred sort. The compressor communicates through a duct P controlled by a valve $p$, with the interior of the mixing-vessel A.

At Q there is a gage of any suitable construction by which the degree of pressure that is being exerted can be readily ascertained.

When the mechanism is in operation, a charge of the materials after being properly commingled in the vessel A is, as aforesaid, passed to the charging vessel F, and the latter being properly connected in the way described with a tire-tube the filling composition is forced into the latter by turning the hand-nut at $g'$, which through the piston or plunger G causes the filler to be pressed into the tube. In order to maintain a uniformity of pressure and to continue the effect thereof properly, I employ the above-described air compressing and delivering apparatus. A charge of the filler is first forced into the tube and then held there under pressure until it becomes thoroughly incorporated with all of the interior surfaces and fills the crevices, it being held under pressure while this is being accomplished. Then, if necessary, supplemental charges of the filler are introduced, and these also are subjected to pressure. In some cases the pressure from the piston or plunger G will be sufficient; but I prefer to supplement that device with an air-pressure in the way described.

In Figs. 5, 6, and 7 I have shown fillers of three somewhat modified forms, which are introduced into or secured within the tire-tubes in the way described. Fig. 5 is a partial longitudinal section of a tire constructed in the way set forth. Fig. 6 is a similar section showing a tire having a filler formed by the addition of comminuted cork to the rubber-like mass. This is mingled and agitated with the rubber part in the vessel A, the particles of the cork being reduced to such an extent that they can pass through the tubes or ducts and into the interior of the tire. The cork particles act to lighten up the filler in proportion to their quantity. In Fig. 7 a somewhat modified process is followed and a slightly different article produced, although the essential features are retained. Here first there is made a mixture of the viscid rubber and the cork particles, and from this there is formed, by molding, elongated strips or filler-bodies, such as shown at R. These are preferably of about the shape in cross-section shown, so as to fill a part of the external tube J—namely, that part which lies toward the general center of the whole body, and therefore it lies near the wheel rim or felly. These are inserted into the tubes before the edges at $j$ are joined. After they have been inserted and after such edges have been joined the body is treated in the way above described and a mass of material, such as shown at R', is then delivered from the mixer O to the charger F, pressure being applied continuously or at intervals in the way described, the result being the producing of a filler which intimately and tightly adheres to the inner surface of the rubber tube J and also to the surfaces of the separately-formed filler-piece R, and which further binds the latter firmly to the tube J.

The tube J to attain the best results should be heated at the time the warmed composition is being introduced, which can be done by either intermittingly immersing it in warm water or by having it so supported in a body of hot water that the charging can be effected while it is thus suspended. I do not, however, limit the invention to the heating of the tube by means of water, although I find this an advantageous method. This heating of the tube is of great importance, in that it insures that the body of injected material shall intimately unite with the inner surface of the rubber sheathing.

What I claim is—

1. The herein-described improvement in the art of manufacturing vehicle-tires, which consists in forming a mass of liquid or viscid material capable of producing on hardening a yielding, flexible filler, heating said mass, introducing it under pressure while heated into the interior of a rubber-like tube or sheathing, and enveloping the said tube or sheathing in heated water during such introduction of the filling mass, substantially as set forth.

2. The herein-described improvement in the art of manufacturing elastic vehicle-tires which consists in heating a formed elastic outer sheath or tire-tube, and then injecting into such sheath or tube a mass of heated viscid filler material capable of forming on hardening an elastic or yielding filler, whereby union between the said filler and the tire-tube is effected, substantially as set forth.

3. The herein-described improvement in the art of manufacturing elastic vehicle-tires which consists in heating a formed elastic sheath or tire-tube, then injecting into the tire-tube a heated mass of filler material capable of forming on hardening an elastic or yielding filler, and maintaining the filler under relatively high pressure until it sets within the tire-tube, substantially as set forth.

4. The herein-described improvement in the art of manufacturing elastic vehicle-tires, which consists in forming a fluid filler comprising sponging and space-forming ingredients, said filler being capable of setting into porous and elastic form, agitating the filler material in contact with a body of air under pressure to aerate it and introducing the said filler in fluid and aerated condition and under pressure into a tube or sheath.

In testimony whereof I affix my signature in presence of two witnesses.

MAX NIRDLINGER.

Witnesses:
N. CURTIS LAMMOND,
RICHARD B. CAVANAGH.